United States Patent
Sakai

(10) Patent No.: US 7,940,958 B2
(45) Date of Patent: May 10, 2011

(54) INFORMATION PROCESSING SYSTEM AND METHOD FOR CONTROLLING THE SAME

(75) Inventor: Rikako Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 946 days.

(21) Appl. No.: 11/761,278

(22) Filed: Jun. 11, 2007

(65) Prior Publication Data

US 2008/0001938 A1 Jan. 3, 2008

(30) Foreign Application Priority Data

Jun. 16, 2006 (JP) .................. 2006-167427

(51) Int. Cl.
*G06K 9/00* (2006.01)
(52) U.S. Cl. ...................... 382/103; 382/107
(58) Field of Classification Search .................. 382/103, 382/107; 348/155
See application file for complete search history.

(56) References Cited

U.S. PATENT DOCUMENTS

| 7,227,893 B1 * | 6/2007 | Srinivasa et al. | 375/240.08 |
| 2003/0185419 A1 | 10/2003 | Sumitomo | |
| 2006/0215030 A1 * | 9/2006 | Shih et al. | 348/155 |

FOREIGN PATENT DOCUMENTS

| JP | 10-285542 A | 10/1998 |
| JP | 2000-050237 A | 2/2000 |
| JP | 2001-201679 A | 7/2001 |
| JP | 2003-284053 A | 10/2003 |
| JP | 2005-004492 A | 1/2005 |

* cited by examiner

*Primary Examiner* — Tom Y Lu

(74) *Attorney, Agent, or Firm* — Canon USA, Inc. IP Division

(57) ABSTRACT

A system specifies a position on a screen of a display unit where a moving image is displayed, and detects a change in a relationship between the specified position and a portion of the moving image. In response to detection of a change in a portion of the moving image with respect to the specified position, the system includes a control unit that is configured to automatically control timing of at least one of start and end of recording of the moving image.

3 Claims, 9 Drawing Sheets

INFORMATION PROCESSING SYSTEM AND METHOD FOR CONTROLLING THE SAME

BACKGROUND OF THE INVENTION

1. Field of the Invention

The present invention relates to a system to input moving images and to control recording of moving images.

2. Description of the Related Art

With respect to capturing images using a camera, there are various methods for obtaining an image intended by a user operating the camera.

During capturing of a still image, a method of automatically releasing a shutter of a camera can be used to capture an image of a moving subject. Also, this method can be used as countermeasures against camera shaking or off timing. For example, Japanese Patent Laid-Open No. 2001-201679 discloses a technique of measuring a distance in a specified area and capturing an image if the subject thereof is placed within a preset frame.

On the other hand, Japanese Patent Laid-Open No. 2003-284053 (corresponding to United States Patent Application Publication No. 2003/0185419) discloses a technique of changing imaging magnification of monitoring images in accordance with a change in an imaging range in a field of monitoring cameras to capture moving images. Japanese Patent Laid-Open No. 2000-050237 discloses a technique of changing an imaging range.

In the methods disclosed in the above-mentioned Patent Documents, however, recording of moving images satisfying a condition intended by a user cannot always be performed, although a starting condition of capturing a still image and recording a moving image can be specified.

Also, as disclosed in Japanese Patent Laid-Open No. 10-285542, there is suggested a technique of controlling start and stop of recording by obtaining a difference between an image specified in advance and a captured image by using a motion vector and encoding the images.

In the method disclosed in Japanese Patent Laid-Open No. 10-285542, however, control is performed on the basis of a change in the entire image, but a condition cannot be set for a change in a specific area in the image. Also, an image to be compared with a captured image needs to be input in advance. Furthermore, the method for specifying a differential evaluation value of a motion vector by a threshold as a condition to control start and stop of recording is not an intuitive operation to specify an image intended by a user and is lacking in reliability.

That is, according to the conventional techniques, it is difficult to reliably set start and end conditions of recording in order to record an image intended by a user.

SUMMARY OF THE INVENTION

Embodiments of the present invention have been made in view of the above-described problems and are directed to enabling setting of start and end of recording of an image intended by a user to a moving image displayed on a screen by using an intuitive operation of specifying an area with a line segment so that only an image satisfying a condition intended by the user can be recorded.

A system according to an embodiment of the present invention includes an input unit configured to input a moving image; a recording unit configured to record the moving image; a specifying unit configured to specify a position on a screen of a display unit where the moving image input by the input unit is displayed; a detecting unit configured to detect a change in a relationship between the position specified by the specifying unit and at least part of the moving image; and a control unit configured to control timing of at least one of start or end of recording of the moving image in the recording unit based on a detection result made by the detecting unit.

According to an embodiment of the present invention, start and end of recording of an image intended by a user can be set to a moving image displayed on a screen by using an intuitive operation of specifying a position so that only an image intended by the user can be reliably recorded.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail in accordance with the accompanying drawings.

Embodiment

<Configuration of Information Processing System>

Figure 1:
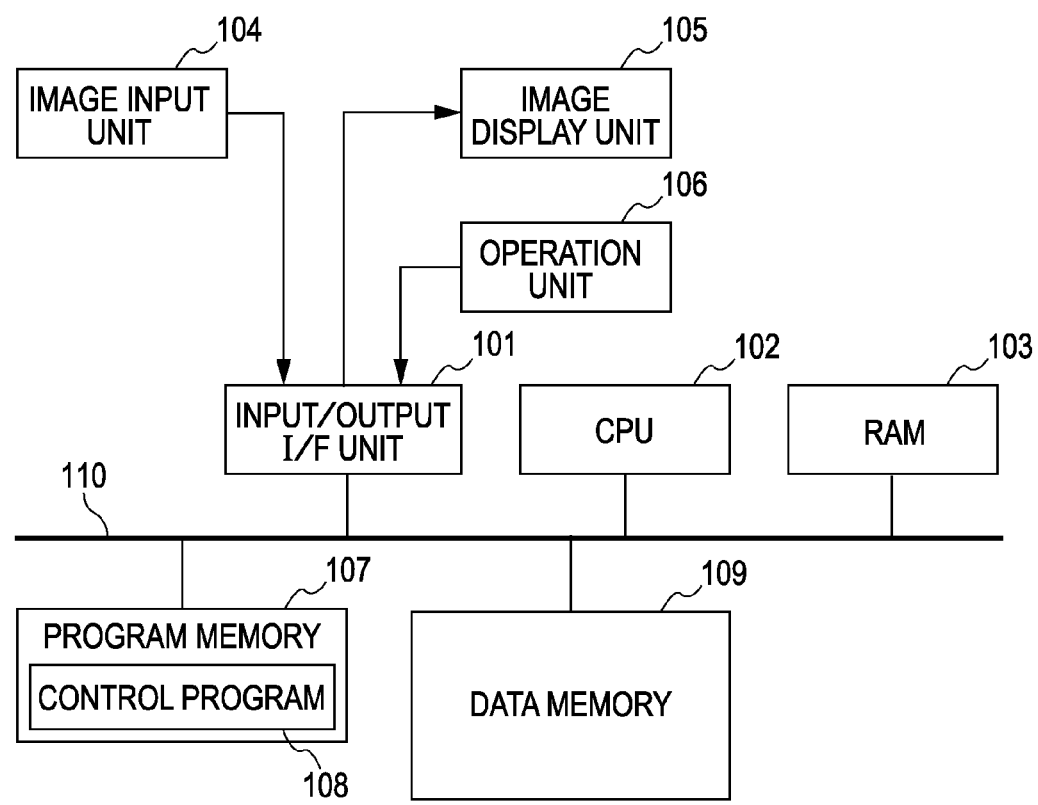
FIG. 1 is a block diagram of a configuration of an information processing system according to an embodiment of the present invention.

FIG. 1 is a block diagram of a system configuration of an information processing system according to an embodiment of the present invention. The information processing system may have an integrated configuration or individual apparatuses may be connected via a network. When the network is used, the apparatuses are connected by a local area network (LAN) so that they can communicate with each other.

In FIG. 1, the information processing system includes an image input unit 104 having a function of inputting a moving image to be displayed in an image display unit 105. The image input unit 104 enables input of image data from an externally-connected image pickup apparatus, such as a camera or a video camera, a server, or a hard disk. The image display unit 105 has a function of displaying the input moving image, and also serves as an operation screen to display a result of a user operation, which is input from an operation unit 106 (described below) via an input/output interface (I/F) unit 101.

The operation unit 106 is an interface for an input device, such as a pointing device represented by a mouse and a keyboard used to input data in accordance with an operation performed by a user, or a digitizer represented by a touch panel.

The image input unit 104, the image display unit 105, and the operation unit 106 connect to a bus 110 via the input/output I/F unit 101 so as to transmit/receive data.

A program memory 107 stores a control program 108 to realize an information processing method according to this embodiment (a process in the flowchart shown in FIG. 2, described below). A data memory 109 stores data processed by the control program 108. The control program 108 is loaded to a RAM (random access memory) 103 via the bus 110 under control by a CPU (central processing unit) 102 and is executed by the CPU 102.

<Process in the Information Processing System>

Figure 2:
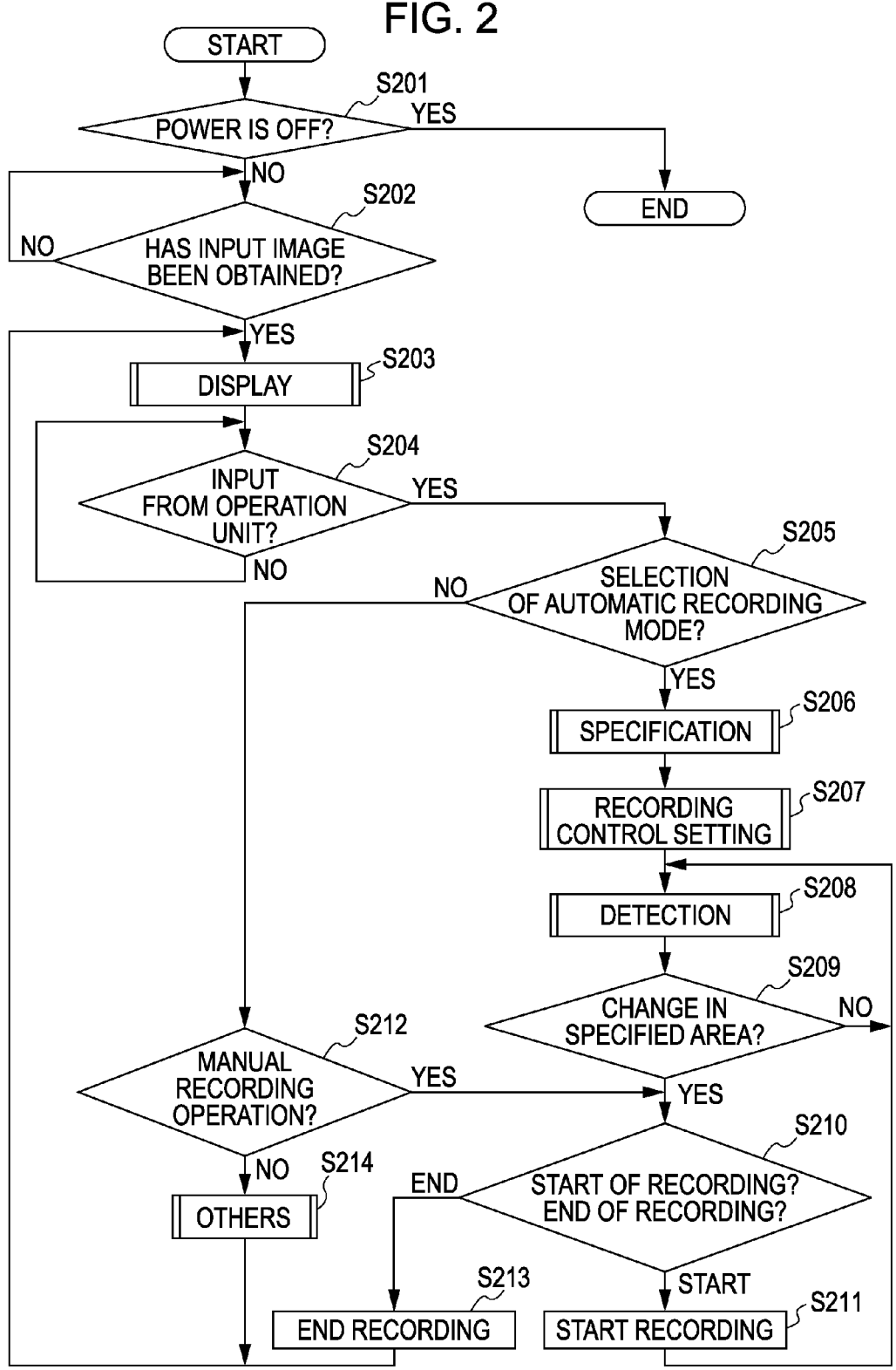
FIG. 2 is a flowchart showing a process performed in the information processing system according to an embodiment of the present invention.

FIG. 2 is a flowchart showing a process performed in the information processing system according to an embodiment of the present invention, which is common to examples described below.

After the information processing system is started in step S201, input from the image input unit 104 is checked in step S202. If an input image has been obtained, the input image is displayed in the image display unit 105 in step S203.

If an input image has not been obtained in step S202, the process waits until an input image can be obtained from the image input unit 104.

After the input image is displayed in the image display unit 105 in step S203, an input from the operation unit 106 is checked in step S204. If nothing is input from the operation unit 106, the process waits until an input from the operation unit 106 is obtained.

When an input from the operation unit 106 is obtained in step S204, the process proceeds to step S205, where the type of the input user operation is determined. If the input user operation is selection of an automatic recording mode, a specifying unit is started in step S206, where specified area information specified by the user operation is obtained and is displayed in the image display unit 105. Herein, the automatic recording mode may be selected by pressing a dedicated hard key that is provided for selecting the automatic recording mode. Alternatively, an existing key in the keyboard may serve as the hard key, or the mode can be selected on a menu displayed.

In step S207, a recording control setting unit is started, and recording control setting is performed on the basis of the specified area information obtained by the specifying unit so that recording starts or ends when a change occurs in the image in the specified area. The setting information is written in the data memory 109. Hereinafter, the area means a position specified by the user, such as a point, a line segment, a curve, or a closed area. Even when a position is manually specified by the user, a prepared figure or line segment may be disposed. The closed line segment may be an area surrounded by a curve, such as a circle, as long as it is closed.

In step S208, a detecting unit is started, and input from the detecting unit is checked on the basis of the condition set in step S207. Steps S208 and S209 are repeated until it is determined that a change has occurred in the specified area. If it is determined in step S209 that a change has occurred in the specified area by input from the detecting unit, the process proceeds to step S210, where the type of recording operation set in the specified area is determined. If it is determined in step S210 that the type is start of recording, the process proceeds to step S211, where recording starts and the input image is recorded in the data memory 109. Then, the process returns to step S208, where input from the detecting unit is checked again. If it is determined in step S209 that a change has occurred in the specified area, the type of recording operation set in the specified area is determined. If the type of recording operation set in the specified area is end of recording, the process proceeds to step S213, where recording ends.

After recording ends in step S213, the process returns to step S203, where the automatic recording mode is canceled. Even while the automatic recording mode is set, priority is constantly put on a manual operation performed by the user. When a manual recording operation is input from the operation unit 106, the process skips to step S210, where a process based on the manual recording operation is performed.

If it is determined in step S205 that the type of user operation is not selection of the automatic recording mode, the process proceeds to step S212, where it is determined whether the manual recording operation is selected. Although not shown, a moving image started to be recorded is recorded in a recording unit.

Herein, the manual recording operation may be selected by pressing one of dedicated hard keys provided for specifying start and end of recording. Alternatively, start or end of recording may be selected by switching ON/OFF of a key. Also, an existing key in the keyboard may serve as the hard key, or the mode can be selected on a menu displayed.

If it is determined in step S212 that the input from the operation unit 106 is the manual recording operation, the process proceeds to step S210, where the type of recording operation is determined. If the type of manual recording operation is start of recording, the process proceeds to step S211, where recording of the image starts. If the type of recording operation determined in step S210 is end of recording, the process proceeds to step S213, where recording of the image ends. Then, the process returns to step S203.

If it is determined in step S205 that the input from the operation unit 106 is not selection of the automatic recording mode and if it is determined in step S212 that the input is not selection of the manual recording operation, the process proceeds to step S214, where another process is started. Then, the process returns to step S203.

Herein, a general operation related to reproducing, such as fast-forward or fast-rewind, is assumed as an operation other than the recording operation. The details thereof are not described here. Note that stop of the information processing system is an interrupt process that can be performed in any step.

<Recording Control Setting Process>

Figure 3:
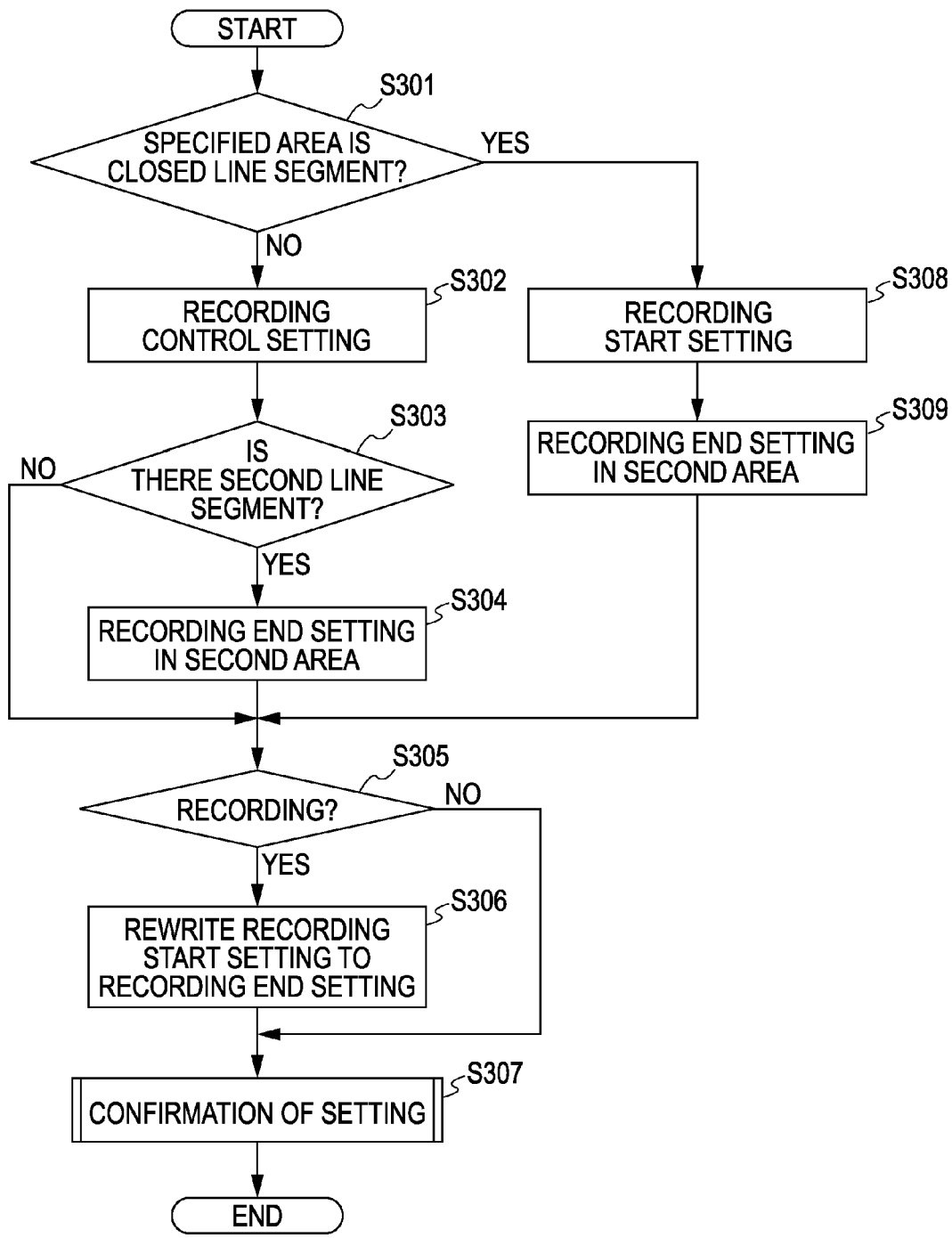
FIG. 3 is a flowchart showing an example of a process performed by a recording control setting unit according to an embodiment of the present invention.

FIG. 3 is a flowchart showing an example of a recording control setting process performed in the information processing system according to an embodiment.

In FIG. 3, after the process starts, the specified area input from the specifying unit is determined in step S301. If the specified area is not a closed line segment, the process proceeds to step S302. If the specified area is a closed line segment, the process proceeds to step S308.

In step S302, setting information to start recording when a change occurs in the image on the coordinates of the line segment as the specified area is written in the data memory 109 while associating the setting information with the information about the specified area.

In step S303, if a second line segment as a second specified area exists, the process proceeds to step S304, where setting is performed so that recording ends when a change occurs in the image on the coordinates of the second line segment, and the setting information is written in the data memory 109.

Then, a current recording state is checked in step S305. If an image is being recorded, the process proceeds to step S306, where the recording start setting in the data memory 109 is rewritten to recording end setting.

Finally, a setting confirmation process is started in step S307, where a dialog or the like to confirm the recording control setting set on the basis of the automatic recording mode with the user is displayed. If the user wants to change the setting, the setting can be changed by a user operation. Alternatively, the user can perform setting so that the setting confirmation process is not performed.

If it is determined in step S301 that the specified area is a closed line segment, both start and end of recording are set to the coordinates of the same line segment. This is particularly effective in a case of recording a subject passing through the area specified by a closed line segment.

In step S308, setting is performed so that recording starts when a change occurs in the image on the coordinates of the line segment. Then, in step S309, setting is performed so that recording ends when a change occurs in the image on the coordinates of the same line segment as the second area.

Then, in step S305, a current recording state is checked. If an image is being recorded, the process proceeds to step S306, where the recording start setting in the data memory 109 is rewritten to the recording end setting. Finally, the setting confirmation process starts in step S307, where the dialog or the like to confirm the recording control setting set on the basis of the automatic recording mode with the user is displayed. Alternatively, a plurality of line segments may be specified, and a plurality of times of start and end of recording may be controlled.

Figure 4:
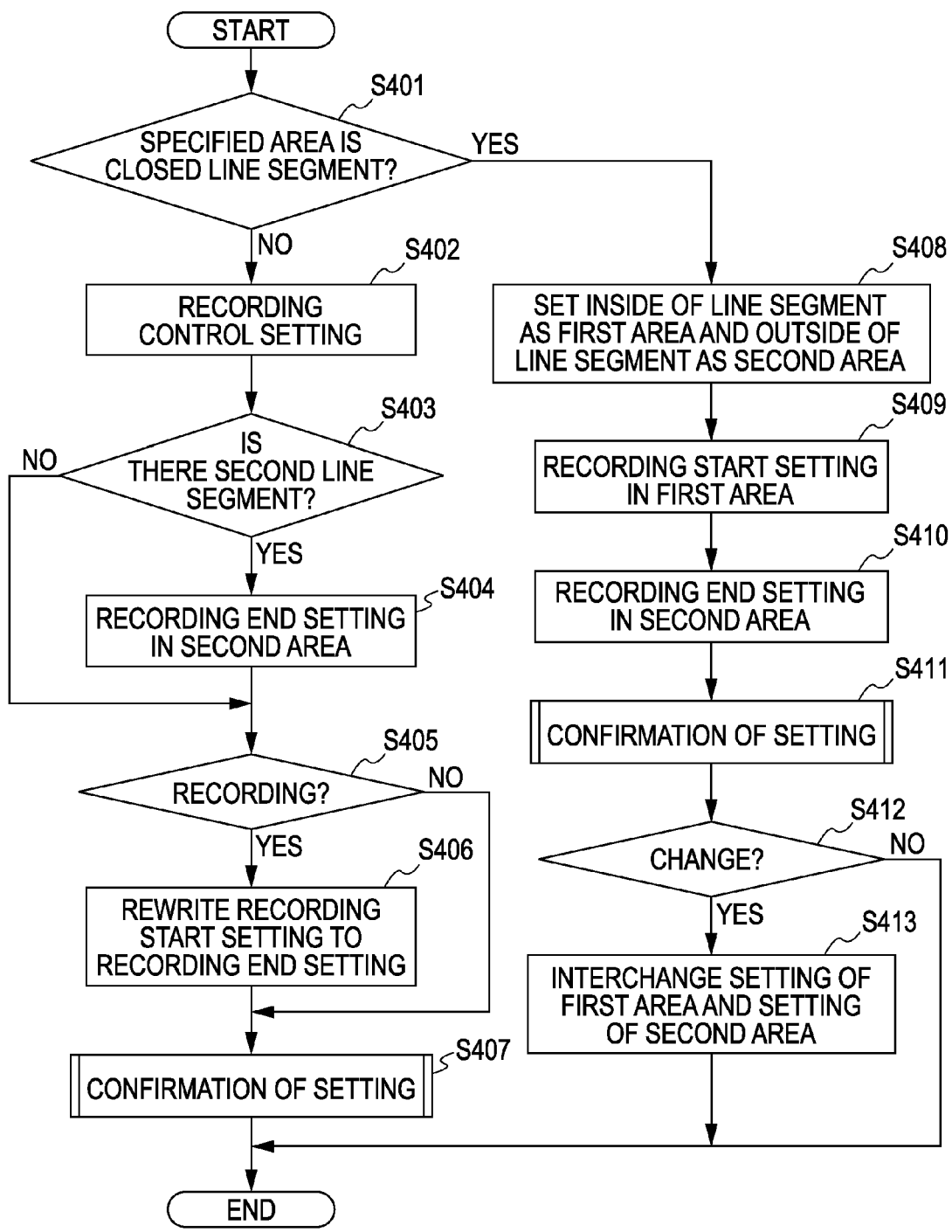
FIG. 4 is a flowchart showing another example of the process performed by the recording control setting unit according to an embodiment of the present invention.

FIG. 4 is a flowchart showing another example of the recording control setting process performed in the information processing system according to an embodiment.

In FIG. 4, after the process starts, the specified area input from the specifying unit is determined in step S401. If the specified area is a closed line segment, the process proceeds to step S408, where the inside of the line segment is set as a first area and the outside of the line segment is set as a second area.

Then, in step S409, setting is performed so that recording starts when a change occurs in the image on the coordinates of the first area. In step S410, setting is performed so that recording ends when a change occurs in the image on the coordinates of the second area. The setting information is written in the data memory 109.

In step S411, the recording start area and the recording end area are presented to the user on the displayed screen. If the setting is changed by a user operation, the setting information is rewritten in step S413 so that the setting in the first area and the setting in the second area are interchanged. That is, recording control setting is performed by setting end of recording in the first area, where start of recording is set in step S409, and by setting start of recording in the second area, where end of recording is set in step S410.

A dialog describing the setting may be displayed so that the user can recognize start and end of recording.

Alternatively, both or one of characters and a symbol generally representing start or end: "Start", "Rec", or "Stop", may be displayed in a corresponding area on the screen, as shown in a screen 801 in FIG. 8.

Figure 8:
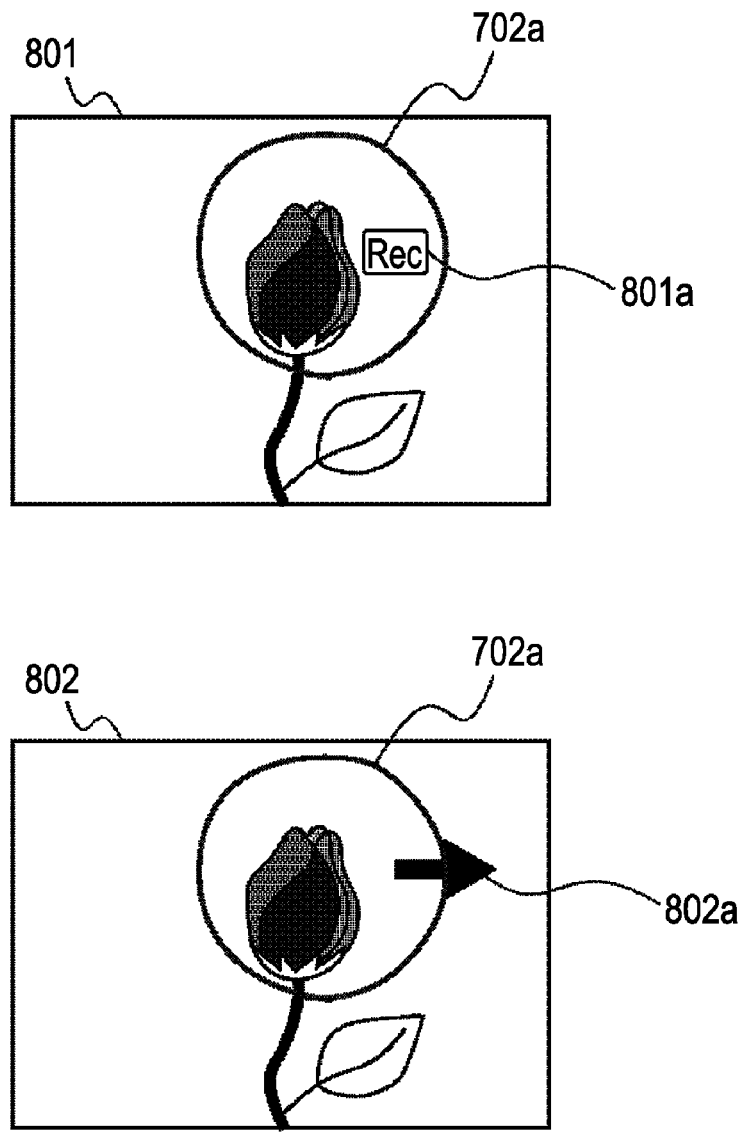
FIG. 8 is a conceptual view of an example of a screen displayed to present recording control setting information to a user in a case where recording control setting is performed by inputting a specified area in an embodiment of the present invention.

Alternatively, an arrow indicating start and end positions of recording may be displayed in a specified area on the screen, as shown in a screen 802 in FIG. 8.

If it is determined in step S401 that the specified area is not a closed line segment, the process proceeds to step S402. Steps S402 to S407 are the same as steps S302 to S307 shown in FIG. 3, and thus the corresponding description is not repeated.

Examples of Displayed Screen in Embodiments of the Present Invention

Figure 5:
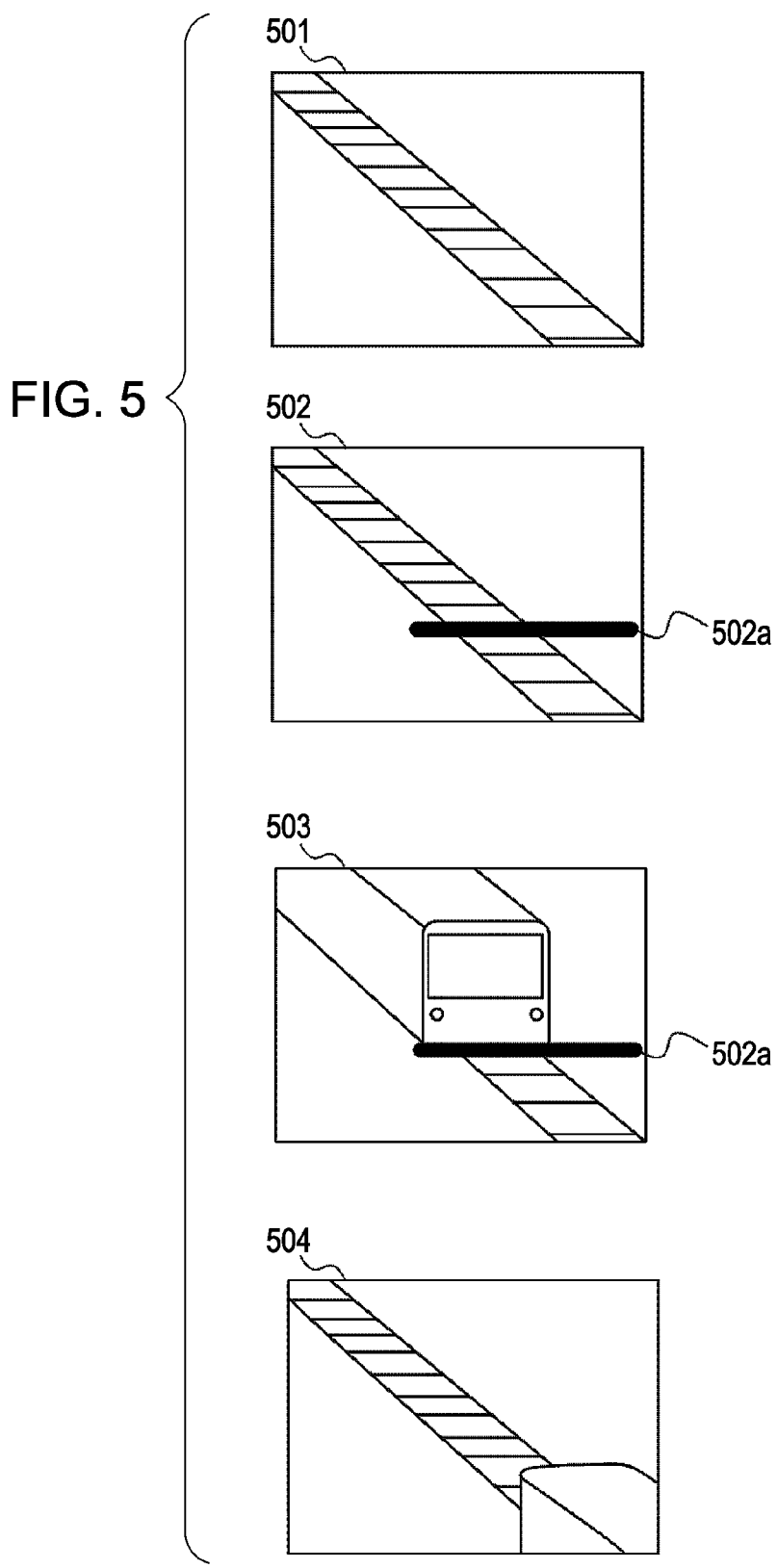
FIG. 5 is a conceptual view of an example of a screen displayed in a case where recording control setting is performed by inputting a specified area in an embodiment of the present invention.

FIG. 5 is a conceptual view showing an example of a recording control unit according to an embodiment. This conceptual view is based on the assumption that an image of a train passing on tracks is recorded while a moving image including the tracks is input.

In FIG. 5, a screen 501 is displayed in the image display unit 105 of the information processing system and shows a state where a moving image input from the image input unit 104 is displayed.

A screen 502 shows a state where a line segment 502a input from the specifying unit on the basis of a user operation is displayed on the screen 501. That is, the screen 502 shows that setting has been made so that recording of an input image starts upon detection of a change in the image in the area of the line segment 502a on the tracks.

A screen 503 shows a state where data of the input image changes after recording control setting has been performed as in the screen 502. As shown in the screen 503, when the head of the train reaches the area of the line segment 502a specified on the screen 502, the change in the image in the area of the line segment 502a is detected and recording of the image starts.

If a manual recording has already started by a user operation at the time when the screen 502 is displayed, end of recording is set to the line segment 502a input by the specifying unit. At this time, recording of the input image ends upon detection of a change in the image in the line segment 502a on the tracks.

In an embodiment, the image display unit 105 also serves as the operation unit 106, such as a touch panel, and a specified area is input by performing drawing on the screen. Alternatively, the specified area may be input by using a pointing device, such as a mouse.

Figure 6:
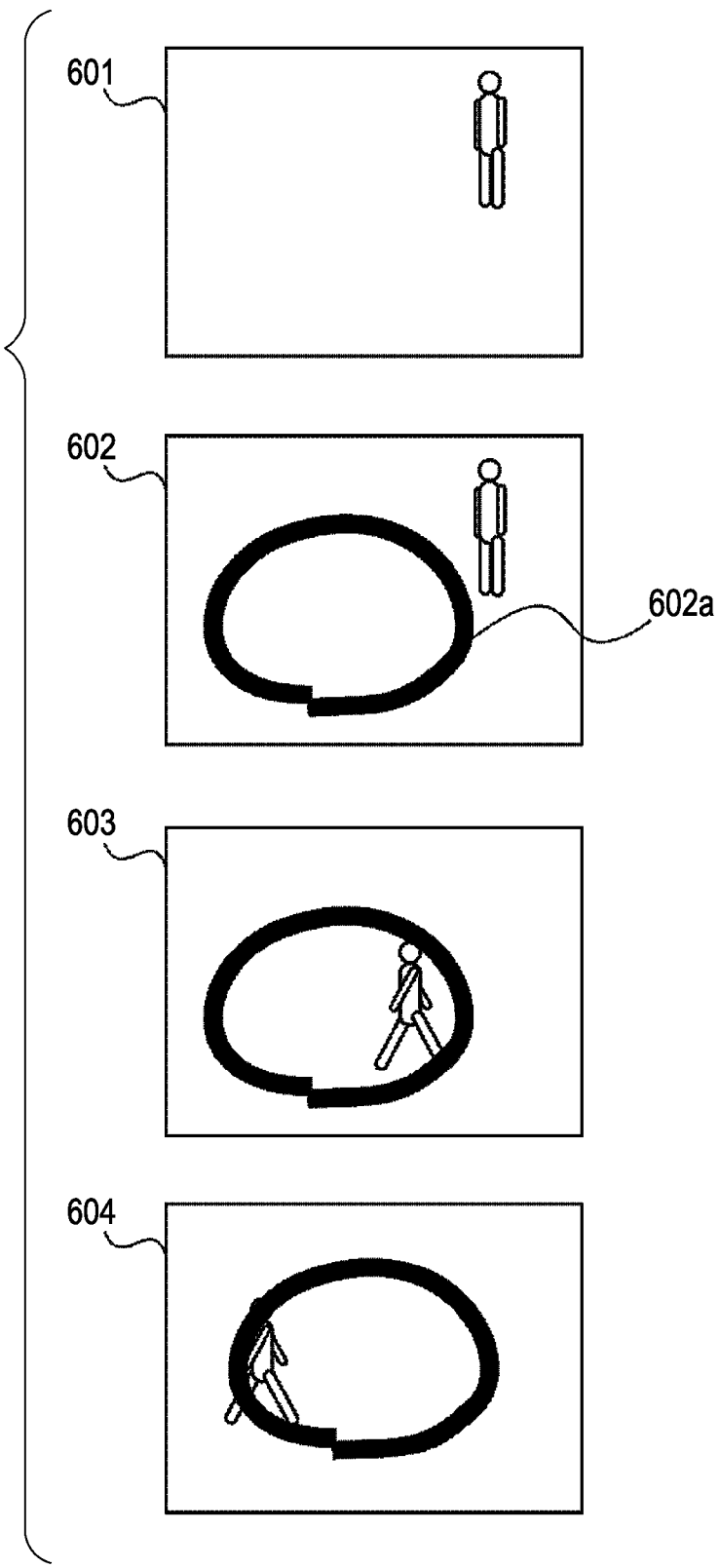
FIG. 6 is a conceptual view of another example of the screen displayed in a case where recording control setting is performed by inputting a specified area in an embodiment of the present invention.

FIG. 6 is a conceptual view showing another example of the recording control unit according to an embodiment. In this example, an area is specified by a closed line segment instead of the line segment shown in FIG. 5.

In this example, start and end of recording are controlled in a specified area surrounded by the closed line segment while a moving image including a person is input. That is, it is assumed that an image of the person moving in the specified area is a target to be recorded.

In FIG. 6, a screen 601 is displayed in the image display unit 105 of the information processing system, and shows a state where a moving image input from the image input unit 104 is displayed.

A screen 602 shows a state where a closed line segment 602a input from the specifying unit on the basis of a user operation is displayed on the screen 601. That is, the screen

602 shows that recording of an input image starts upon detection of a change in the image in the area of the closed line segment 602a.

Screens 603 and 604 show states where data of the input image changes after recording control setting has been performed as shown in the screen 602.

As shown in the screen 603, when the person passes the area 602a specified as the closed line segment in the screen 602, the change in the image in the area 602a is detected and recording of the image starts. As shown in the screen 604, when the person passes again the area 602a specified as the closed line segment in the screen 602, the change in the image in the area 602a is detected and recording ends.

Figure 7:
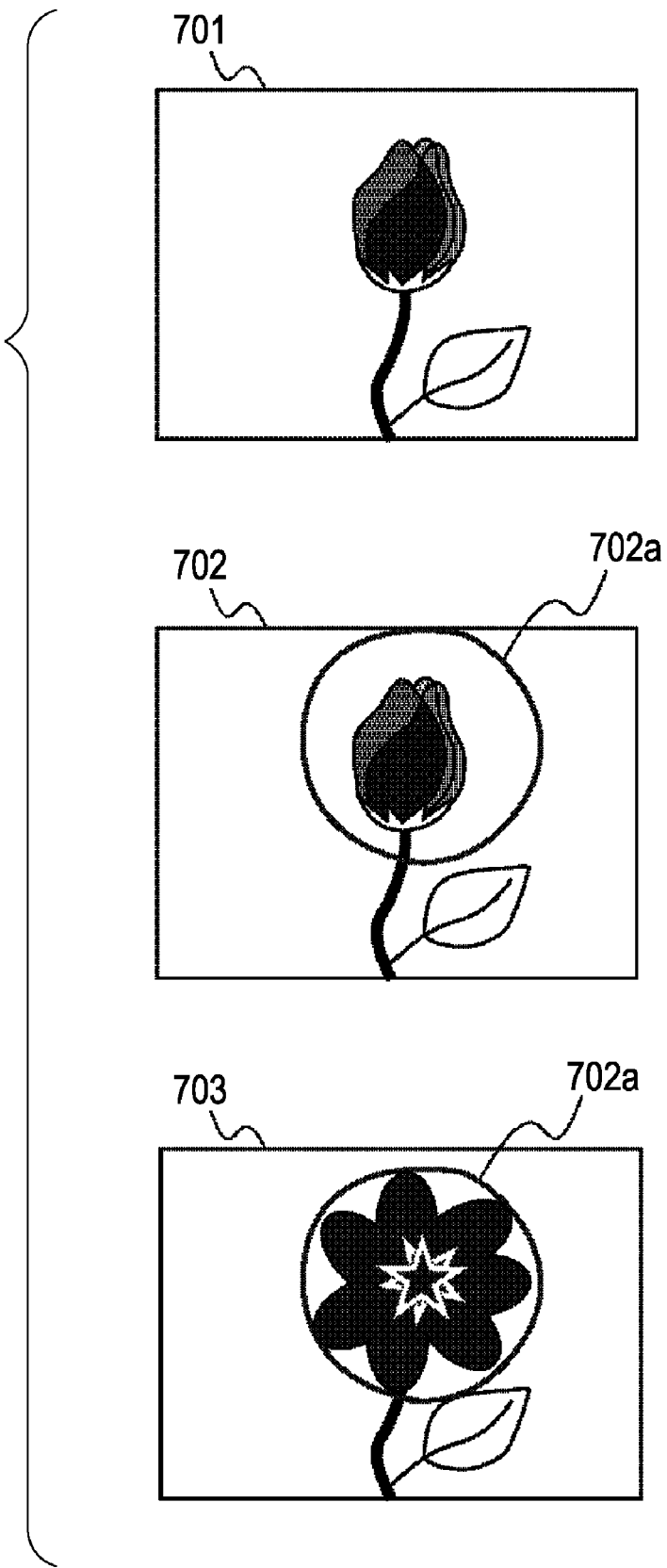
FIG. 7 is a conceptual view of another example of the screen displayed in a case where recording control setting is performed by inputting a specified area in an embodiment of the present invention.

FIG. 7 is a conceptual view showing another example of the recording control unit according to an embodiment. As in FIG. 6, an area is specified by a closed line segment. Note that, in FIG. 7, control of start and end of recording is changed in the inside and outside of the closed line segment.

In FIG. 7, while an input moving image of a bud of flower is displayed, an area around the bud is specified by a closed line segment on the screen and an image of the flower until the bud bursts and the flower blooms is specified as a target to be recorded. That is, recording control setting is performed so that recording starts upon detection of a change inside the specified area and that recording ends upon detection of a change outside the specified area.

In FIG. 7, a screen 701 is displayed in the image display unit 105 of the information processing system and shows a state where a moving image input from the image input unit 104 is displayed.

A screen 702 shows a state where a line segment 702a input by the specifying unit on the basis of a user operation is displayed on the screen 701. That is, the screen 702 shows that setting is performed so that recording of an input image starts upon detection of a change in the image in the area of the closed line segment 702a.

A screen 703 shows a state where data of the input image changes after the recording control setting has been performed as in the screen 702. In this example, the flower that is a bud on the screen 701 blooms on the screen 703.

FIG. 8 shows an example of a method for enabling the user to identify start and end of recording by a recording control setting confirmation unit in the recording control unit according to an embodiment.

In FIG. 8, the screens 801 and 802 show a state where a moving image input from the image input unit 104 is displayed in the image display unit 105. The closed line segment 702a indicates a specified area input by the specifying unit.

In the screen 801, characters "Rec" 801a indicating start of recording are displayed inside the specified area on the screen so that the user can recognize that the recording control setting starts recording of an input image upon detection of a change in the image inside the specified area.

Instead of characters, a symbol or a figure may also be used as long as it represents start of recording. Also, only end of recording or both start and end of recording may be displayed in the area on the screen.

In the screen 802, an arrow 802a starting at the inside of the specified area and indicating the outside thereof is displayed on the screen so that the user can recognize that the recording control setting starts recording of an input image upon detection of a change in the image inside the specified area.

When the user wants to change the recording control setting, the user may change the setting by selecting and moving the recording control setting conformation, such as the characters 801a or the arrow 802a presented to the user.

For example, when the user wants to change the setting so that recording starts upon change in the image outside the specified area, not inside the specified area, the user may select the characters 801a and move it to the outside of the specified area 702a. Alternatively, the user may select the arrow 802a and change the direction thereof so as to change the recording control setting.

Figure 9:
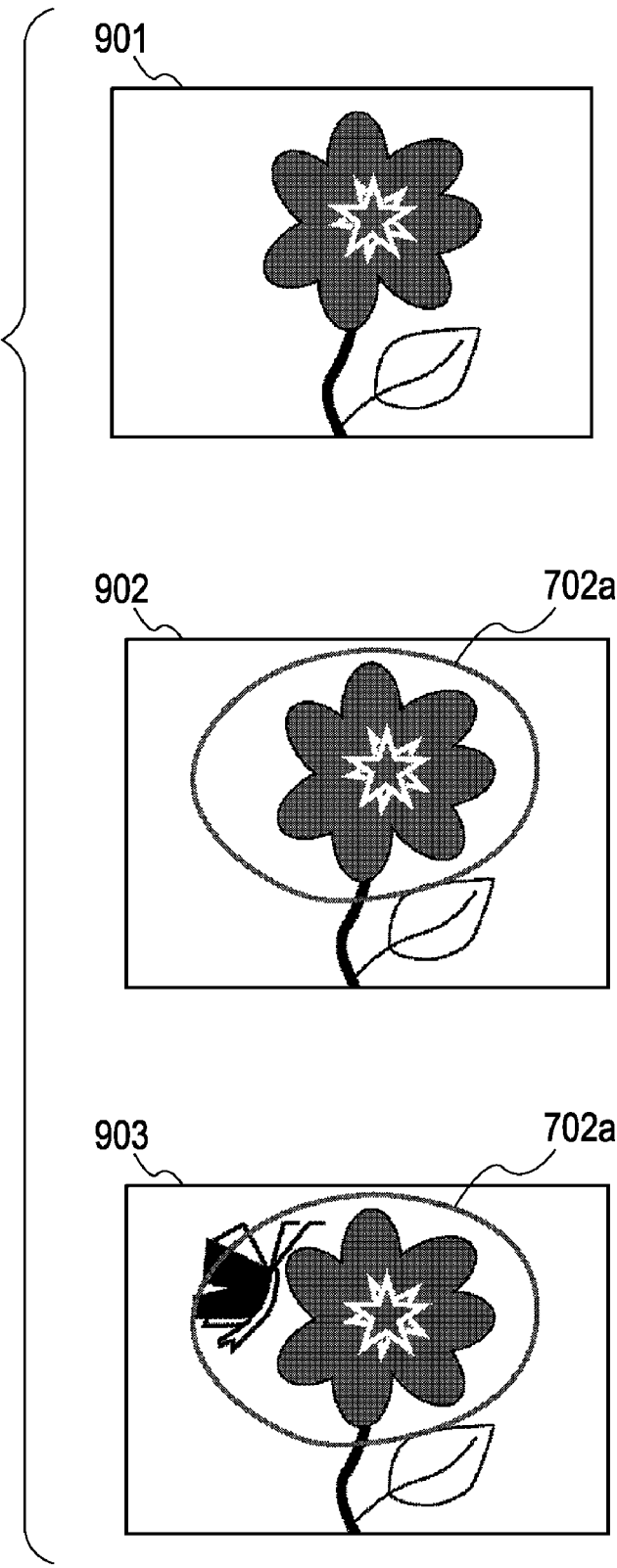
FIG. 9 is a conceptual view of another example of the screen displayed in a case where recording control setting is performed by inputting a specified area in an embodiment of the present invention.

FIG. 9 is a conceptual view showing another example of the recording control unit according to an embodiment. As in FIG. 7, an area is specified by a closed line segment, and start and end of recording are controlled inside and outside of the specified area. The difference from FIG. 7 is that recording starts upon change in the image outside the area and that recording ends when sequential changes in the image ends inside of the area.

In this example, while a moving image including flower is input, an area around the flower is specified by a closed line segment on the screen. If a change is detected outside the specified area, for example, if a butterfly comes near the flower, recording starts. The image is recorded until the butterfly stops on the flower.

In FIG. 9, a screen 901 is displayed in the image display unit 105 of the information processing system and shows a state where a moving image input from the image input unit 104 is displayed.

A screen 902 shows a state where the closed line segment 702a input from the specifying unit on the basis of a user operation is displayed on the screen 901. That is, setting is made so that recording of an image starts upon detection of a change in the image in the area of the closed line segment 702a.

A screen 903 shows a state where a change occurs in the input image after the recording control setting has been performed as in the screen 902. Specifically, the screen 903 shows a state where the butterfly that does not exist on the screen 902 appears and enters the inside of the specified area 702a.

Example 1

Hereinafter, a flow of the process according to an embodiment is described in detail with reference to the conceptual view shown in FIG. 5 and the flowcharts shown in FIGS. 2 and 3.

In FIG. 5, it is assumed that an image of a train passing on tracks is specified as a target to be recorded while a moving image of the tracks is input. The image input by the image input unit 104 may be a picked up image input from an image pickup apparatus, such as a video camera, connected to the information processing system directly or via a network. Alternatively, the image may be moving image data read from a connected reproducing apparatus or a recording medium.

In FIG. 5, when the image input from the image input unit 104 is displayed as in the screen 501 (step S203), the user performs an operation on the menu from the operation unit 106 (step S204) so as to select the automatic recording mode (step S205).

At this time, if the user inputs the line segment 502a onto the screen via the operation unit 106, the specifying unit is started by the control program 108 (step S206), and the specified area input by the user is displayed on the screen (screen 502). At the same time, coordinate data of the specified area obtained by the specifying unit is stored as temporary data in the data memory 109.

Then, the recording control setting unit is started and recording control setting is performed with reference to the coordinate data of the specified area stored in the data memory 109. In this case, since the specified area is a line segment (step S301), recording control setting is performed so that recording starts upon detection of a change in the image on the coordinates of the line segment, which is the specified area (step S302).

Then, it is determined whether input image data is currently being recorded (step S305). In this example, assuming that the image data is being recorded, the data memory 109 is rewritten so that the setting on the line segment is changed from recording start setting to recording end setting (step S306).

Then, confirmation of setting is performed to the user (step S307). After a response to the confirmation from the user is obtained from the operation unit 106, recording end setting to the specified area is stored in the data memory 109 and the recording control setting unit ends.

In this way, after recording control setting has been performed by the recording control setting unit described above with reference to FIG. 3, the detecting unit is started (step S208), and the control program 108 checks input from the detecting unit (step S209).

Then, if a change occurs in the input image and the image displayed on the screen 503 appears, the detecting unit detects the change in the image in the specified area (step S209), and a process is performed on the basis of the recording control setting in the specified area stored in the data memory 109.

In this example, recording control setting is performed so that recording ends upon detection of a change in the image on the coordinates of the line segment as the specified area. Thus, it is determined that recording should be ended (step S210) and the recording ends (step S213). That is, the recording ends at the time when the head of the train reaches the specified area 502a.

Even in the automatic recording setting mode, priority is constantly put on a manual operation by the user. Thus, the process is performed on the basis of a manual recording operation upon input of the manual recording operation (step S212).

Herein, the manual recording operation may be selected by pressing one of dedicated hard keys provided for specifying start and end of recording. Alternatively, start or end of recording may be selected by switching ON/OFF of a key. Also, an existing key in the keyboard may serve as the hard key, or the mode may be selected on a menu displayed.

In this example, only end of recording is controlled. However, setting can be made so that recording starts upon detection of a change in the image in the specified area in the displayed input image by the detecting unit.

Alternatively, setting can be made so that recording starts upon detection of a change in the image in the specified area by the detecting unit and that recording ends when the change stops being detected.

In that case, setting is made in step S302 so that recording starts upon detection of a change in the image on the coordinates of the line segment as the specified area and that recording ends upon stop of the change, and the setting information is written in the data memory 108 while associating the setting information with the information of the specified area.

As a result, recording of an input image starts when the head of the train reaches the position of the line segment 502a specified on the screen 502, and the recording ends just after the last car of the train has passed the line segment 502a.

In this example, both or any one of start and end of recording is controlled by regarding a line segment as a specified area. Alternatively, start and end of recording can be reliably specified by using two line segments. This is particularly effective in a case where an image is recorded only while a subject passes a specified zone. This case is described below. That is, a case where start and end of recording are controlled by using a specified area of a closed line segment instead of two line segments is described with reference to the conceptual view shown in FIG. 6.

In FIG. 6, start and end of recording are controlled in a specified area surrounded by a closed line segment while a moving image including a person is input. That is, it is assumed that an image is recorded while the person moves in the specified area.

The image input by the image input unit 104 may be a picked up image input from an image pickup apparatus, such as a video camera, connected to the information processing system directly or via a network. Alternatively, the image may be already-generated moving image data read from a connected reproducing apparatus or a recording medium.

In FIG. 6, while the image input from the image input unit 104 is displayed as in the screen 601 (step S203), the user operates the menu via the operation unit 106 (step S204) and selects the automatic recording mode (step S205).

At this time, if the user inputs the line segment 602a onto the screen via the operation unit 106, the specifying unit is started by the control program 108 (step S206), and the specified area input by the user is displayed on the screen (screen 602). At the same time, coordinate data of the specified area obtained by the specifying unit is stored as temporary data in the data memory 109.

Then, after the recording control setting unit is started, recording control setting is performed with reference to the coordinate data of the specified area stored in the data memory 109. In this case, since the specified area is a closed line segment (step S301), recording start setting (step S308) and recording end setting (step S309) are performed so that recording starts and ends upon detection of a change in the image on the coordinates of the line segment as the specified area.

Then, it is determined whether input image data is currently being recorded (step S305). In this example, confirmation of setting is performed to the user (step S307) assuming that recording is not being performed. After a response to the confirmation from the user has been obtained from the operation unit 106, recording end setting to the specified area is stored in the data memory 109 and the recording control setting unit ends. In this example, it is assumed that the user does not change the setting at confirmation of the setting.

In this way, after recording control setting has been performed by the recording control setting unit described above with reference to FIG. 3, the detecting unit is started (step S208), and the control program 108 checks input from the detecting unit (step S209).

Then, if a change occurs in the input image and the screen 603 is displayed, the detecting unit detects the change in the image in the specified area (step S209), and performs a process on the basis of the recording control setting of the specified area stored in the data memory 109.

In this example, recording control setting is performed so that recording starts upon detection of a change in the image on the coordinates of the line segment as the specified area. Thus, it is determined that recording should be started (step S210) and recording starts (step S211). That is, recording starts when the moving person is displayed in the specified area 602a. Also, as shown in the screen 604, when the moving person passes the area 602a, the change in the image in the area 602a is detected again and recording ends.

In this example, both start and end of recording are set and executed. However, only start or end of recording can be set.

Example 2

In example 1, start or end of recording is controlled on the basis of a change in the image in the specified area. In example 2, recording is controlled on the basis of a direction in which a change in the image occurs in the specified area.

That is, in a case where the input specified area is a closed line segment, start and end of recording are controlled when a change in the image inside the specified area continues beyond the specified area to the outside of the specified area.

Hereinafter, a flow of the process according to this example is described in detail with reference to the conceptual view shown in FIG. 7 and the flowchart shown in FIG. 4.

In FIG. 7, while a bud of flower is displayed in an input moving image, an area around the bud is specified by a closed line segment, and image data of the time from when the bud bursts to when the flower blooms and extends beyond the specified area is obtained.

The image input by the image input unit 104 may be a picked up image input from an image pickup apparatus, such as a fixed video camera, connected to the information processing system directly or via a network. Alternatively, the image may be moving image data read from a connected reproducing apparatus or a recording medium.

In FIG. 7, when the image input from the image input unit 104 is displayed (step S203) as in the screen 701, the user operates the menu via the operation unit 106 (step S204) and selects the automatic recording mode (step S205).

At this time, if the user inputs the line segment 702a onto the screen via the operation unit 106, the specifying unit is started by the control program 108 (step S206) and the specified area input by the user is displayed on the screen (screen 702). At the same time, the coordinate data of the specified area obtained from the specifying unit is stored as temporary data in the data memory 109.

Then, after the recording control setting unit is started, recording control setting is performed with reference to the coordinate data of the specified area stored in the data memory 109. In this case, since the specified area is a closed line segment (step S401), the inside of the line segment as the specified area is set as a first area and the outside of the line segment is set as a second area (step S408). Then, setting is performed so that recording starts upon detection of a change in the image in the first area (step S409) and that recording ends upon detection of a change in the image in the second area (step S410), and the setting information is written in the data memory 109.

Then, as shown in FIG. 8, the setting is confirmed with the user so that the area where recording starts and the area where recording ends can be recognized on the screen (step S411). In this example, the arrow 802a starting at the inside of the closed line segment and indicating the outside thereof is displayed (screen 802), so that the user can recognize that recording starts upon detection of a change inside the specified area and that recording ends upon detection of a change outside the specified area.

After a response to the confirmation of setting from the user is input from the operation unit 106 (step S412), recording end setting to the specified area is stored in the data memory 109 and the recording control setting unit ends. In this example, assume that the user does not change the setting at confirmation.

In this way, after the recording control setting has been performed by the recording control setting unit described above with reference to FIG. 4, the detecting unit is started (step S208), and the control program 108 checks input from the detecting unit (step S209). Then, if a change occurs in the input image and the screen 703 is displayed, the change in the image in the specified area is detected by the detecting unit (step S209), and a process is performed on the basis of the recording control setting of the specified area stored in the data memory 109.

In this example, recording control setting is performed so that recording starts upon detection of a change in the image inside the specified area 702a. Thus, it is determined that recording should be started (step S210) and recording starts (step S211). That is, recording starts when the bud inside the specified area 702a starts to burst. As shown in the screen 703, when the flower blooms to extend beyond the specified area 702a, the change in the image in the specified area 702a is detected again and recording ends.

In this example, recording starts upon detection of a change in the image inside the specified area and recording ends when the change continues beyond the specified area. However, the settings of inside and outside can be exchanged. This case is shown in FIG. 9.

In this example, both start and end of recording are set and performed. However, only start or end of recording can be set. Furthermore, start or end of recoding can be manually specified and performed by a user operation.

According to an embodiment of the present invention, an image input unit to input a moving image is realized by the image input unit 104 connected to an image pickup apparatus, such as a digital camera or a video camera. Alternatively, the image input unit may be realized by the image input unit 104 connected to a hard disk recorder or a video reproducing apparatus to record a television broadcasted program or a reproducing apparatus to reproduce content recorded in a DVD (digital versatile disc).

According to an embodiment of the present invention, the input moving image is a picked up image input from a connected image pickup apparatus. However, the moving image input from the input unit is not limited to this, but may be already-generated moving image data read from a reproducing apparatus. Also, the format of the image is not limited and both analog and digital formats can be accepted.

According to an embodiment of the present invention, in the first and second examples, the specifying unit to specify an area on a displayed screen is the touch panel integrated with the display unit. However, the specifying unit is not limited to the touch panel, but may be a display device connected by a pointing device, such as a mouse or a keyboard, or may be a screen integrated with the image pickup apparatus.

According to an embodiment of the present invention, the detecting unit to detect a change in a moving image is not specified, but may be realized by a typical method, such as interframe comparison. Also, the detecting unit may be realized by using sensor information obtained by a connected sensor.

According to an embodiment of the present invention, the control unit to control start and end of recording of an image is realized by providing the automatic recording mode and allowing the user to select the automatic recording mode. Alternatively, the automatic recording mode can be started any time when the user inputs a specified area.

In the above-described embodiment, the detecting unit detects a change in the relationship between a specified area and a moving image. However, the detecting unit may recognize an object included in the moving image and detect a change in the relationship between the object and the specified area. In that case, the detecting unit includes a specifying unit to specify an object and recognizes the specified object.

Embodiments of the present invention can be carried out by supplying a storage medium storing a program code of software to realize the function of the above-described embodiment to a system or an apparatus, and by allowing a computer in the system or the apparatus to read and execute the program code. In this case, the program code read from the storage medium realizes the function of the above-described embodiment, and thus the storage medium storing the program code is included in the present invention.

A computer network, such as a LAN (local area network) or a WAN (wide area network), can be used to supply the program code.

On the basis of instructions of the program code read by the computer, an OS (operating system) operating in the computer may execute part or all of actual processes, which may realize the function of the above-described embodiment.

Furthermore, the following case can be accepted. First, the program code read from the storage medium is written in a memory provided in a function expansion board inserted into the computer or a function expansion unit connected to the computer. Then, on the basis of the instructions of the program code, a CPU (central processing unit) included in the function expansion board or the function expansion unit executes part or all of actual processes, which realize the function of the above-described embodiment.

The present invention is not limited to the above embodiment, and various changes and modifications can be made within the spirit and scope of the present invention. Therefore to apprise the public of the scope of the present invention, the following claims are made.

This application claims the benefit of Japanese Application No. 2006-167427 filed Jun. 16, 2006, which is hereby incorporated by reference herein in its entirety.

What is claimed is:

1. A method comprising:
    displaying a moving image on a display screen;
    designating a region of the display screen;
    detecting a change of a moving image inside the region of the moving image and a change of a moving image outside the region of the moving image; and
    controlling timing of recording the moving image by a recording unit such that the recording of the moving image is started in response to the change of the moving image inside the region being detected, and the recording of the moving image is terminated in response to the change of the moving image outside the region being detected.

2. A program stored on non-transitory computer readable medium for causing an apparatus to perform operations comprising:
    detecting a change of a moving image inside the region of the moving image and a change of a moving image outside the region of the moving image; and
    controlling timing of recording the moving image by a recording unit such that the recording of the moving image is started in response to the change of the moving image inside the region being detected, and the recording of the moving image is terminated in response to the change of the moving image outside the region being detected.

3. An apparatus comprising:
    a display unit having a display screen configured to display moving images;
    a recording unit configured to record moving images;
    a user interface unit configured to receive a user input and to designate a region of the display screen based on the user input; and
    a control unit configured to control timing of recording the moving image by a recording unit such that the recording of the moving image is started in response the change of the moving image inside the region being detected, and the recording of the moving image is terminated in response to the change of the moving image outside the region being detected.

* * * * *